United States Patent [19]

Lay et al.

[11] Patent Number: 4,869,868
[45] Date of Patent: * Sep. 26, 1989

[54] NUCLEAR FUEL

[75] Inventors: Kenneth W. Lay, Schenectady, N.Y.; Herman S. Rosenbaum, Fremont; John H. Davies, San Jose, both of Calif.

[73] Assignee: General Electric Company, Schenectady, N.Y.

[ * ] Notice: The portion of the term of this patent subsequent to Sep. 26, 2006 has been disclaimed.

[21] Appl. No.: 124,126

[22] Filed: Nov. 23, 1987

[51] Int. Cl.[4] .............................................. G21C 3/00
[52] U.S. Cl. .................................. 376/421; 252/636; 252/638; 264/0.5; 423/255; 423/261
[58] Field of Search ..................... 376/421, 422, 901; 264/0.5; 252/636, 638; 423/255, 261

[56] References Cited

U.S. PATENT DOCUMENTS

| | | | |
|---|---|---|---|
| 3,263,004 | 7/1966 | Bean | 264/0.5 |
| 3,501,411 | 3/1970 | Triggiani et al. | 252/301.1 R |
| 3,679,596 | 7/1972 | Hill et al. | 252/301.1 R |
| 3,715,273 | 2/1973 | Rigby et al. | 376/421 |
| 3,826,754 | 7/1974 | Grossman | 252/301.1 R |
| 3,867,489 | 2/1975 | Rubin | 264/0.5 |
| 3,872,022 | 3/1975 | Hollander et al. | 252/301.1 R |
| 3,883,623 | 5/1975 | Lay | 264/0.5 |
| 3,923,933 | 12/1975 | Lay | 264/0.5 |
| 3,927,154 | 12/1975 | Carter | 264/0.5 |
| 4,052,330 | 10/1977 | Jensen et al. | 252/301.1 R |
| 4,094,738 | 6/1978 | Chubb | 376/421 |
| 4,264,540 | 4/1981 | Butler | 264/0.5 |
| 4,401,608 | 8/1983 | Smith | 264/0.5 |

FOREIGN PATENT DOCUMENTS 55-27942  2/1980  Japan .

Primary Examiner—Donald P. Walsh
Attorney, Agent, or Firm—Jane M. Binkowski; James C. Davis, Jr.; James Magee, Jr.

[57] ABSTRACT

A particulate mixture of uranium dioxide and additive of magnesium silicate composition is formed into a compact and sintered to produce a nuclear fuel wherein the uranium dioxide grains have an average grain size of at least about 20 microns and wherein substantially all of the grains are each enveloped with glassy magnesium silicate phase.

32 Claims, 1 Drawing Sheet

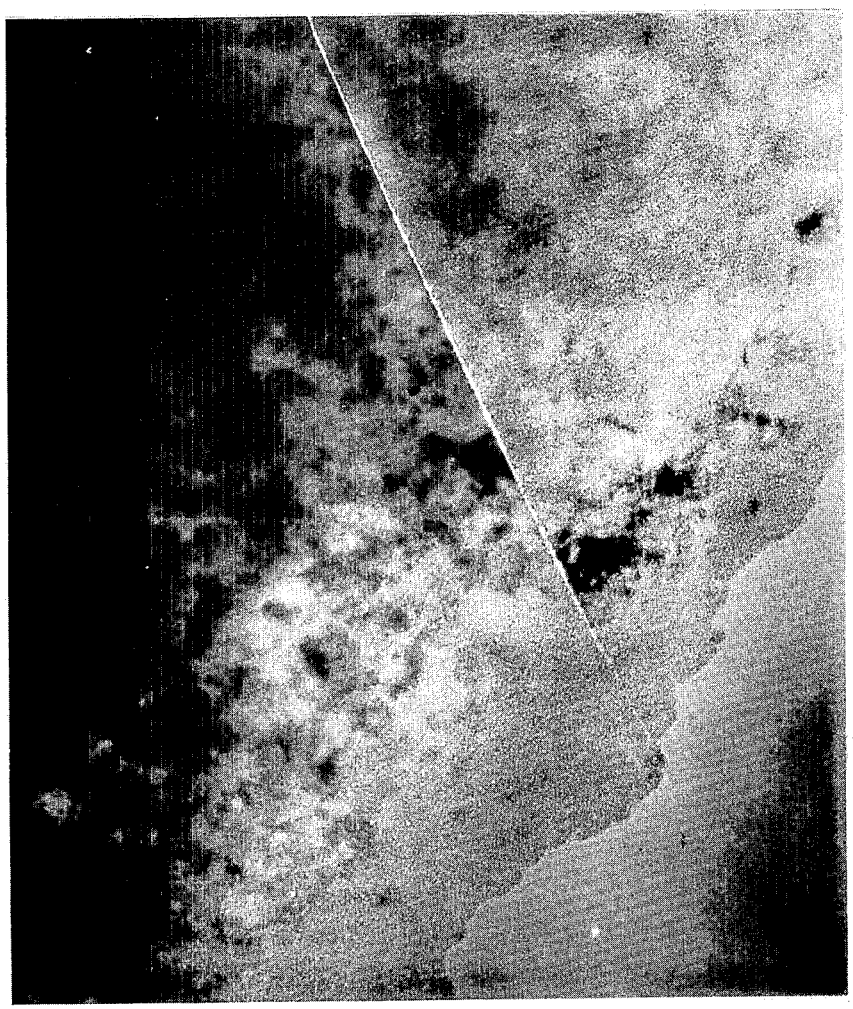

NUCLEAR FUEL

In copending Ser. No. (123616) filed Nov. 20, 1987, for "Nuclear Fuel", Lay et al., assigned to the assignee hereof and incorporated herein by reference, there is disclosed that a mixture of uranium dioxide and aluminosilicate sintering agent is formed into a compact and sintered to produce a nuclear fuel wherein the uranium dioxide grains have an average grain size of at least about 20 microns and wherein the grains are coated with glassy aluminosilicate phase.

This invention relates to the production of a nuclear fuel body with improved mechanical properties. In one aspect, it is directed to firing a compact of particular composition comprised of uranium dioxide and a magnesium silicate to produce a nuclear fuel of particular microstructure.

Nuclear reactors are presently being designed, constructed and operated in which the fissionable material or nuclear fuel is contained in fuel elements which may have various geometric shapes, such as plates, tubes or rods. Nuclear fuel is enclosed usually in a corrosion-resistant, non-reactive, heat conductive container or clad which as assembled with the nuclear fuel is called a fuel element. The fuel elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reactor. The core is enclosed within a reactor vessel through which a coolant is passed.

The clad serves two primary purposes: first, to prevent contact and chemical reactions between the nuclear fuel and either the coolant or moderator if present, or both; and second, to prevent the highly radioactive fission products, some of which are gases, from being released from the fuel into the coolant or moderator or both. Common clad materials are stainless steel, aluminum and its alloys, zirconium and its alloys, niobium (columbium), certain magnesium alloys and others. The failure of the clad, due to the buildup of gas pressure or high temperatures in the fuel, or due to corrosion of the clad by deleterious fission products, can contaminate the coolant or moderator and the associated steam systems with intensely radioactive long-lived products to a degree which interferes with plant operation.

The present theoretical and experimental information indicates that a larger grain size in uranium dioxide nuclear fuel will reduce fission gas release rates, a desired attribute which would result in either reduced void space in the fuel rod or an increased design burn-up life for the fuel. Unfortunately, as grain size is increased, the high temperature creep rate of the fuel is reduced - an undesirable result since this gives a greater strain on the clad during a reactor power ramp. Such fuel-induced cladding strain can lead to a cladding failure via a mechanism known as PCI (Pellet Clad Interaction). A fuel with both a larger grain size and an increased creep rate is therefore of interest. Such a fuel is provided by the present invention.

The present nuclear fuel has a microstructure which is useful in avoiding cladding failure. Specifically, the present fuel is a sintered body comprised of uranium dioxide grains having an average size of at least about 20 microns whereas the grains are surrounded by a glassy magnesium silicate phase. At an elevated temperature, generally at about 1000° C. and higher, the glassy phase increases the creep rate or plasticity of the sintered body significantly above that of uranium dioxide.

Those skilled in the art will gain a further and better understanding of the present invention from the detailed description set forth below, considered in conjunction with the accompanying figure forming a part of the specification which is a transmission electron micrograph of a polished cross-section (magnified 1.050 million×) of the present sintered body showing the glassy magnesium silicate phase as a substantially straight light-colored line.

Briefly stated, the present process for producing a sintered uranium dioxide body wherein the uranium dioxide grains have an average size of at least about 20 microns and wherein at least about 99% by volume of said grains are each coated with glassy magnesium silicate phase leaving no significant portion thereof exposed comprises providing a sinterable uranium dioxide powder containing a fissionable substance, providing a material with a sintering agent composition comprised of from about 10 weight % to about 55 weight % of MgO balance $SiO_2$ or precursor therefor, admixing said material with said uranium dioxide powder to give said sintering agent composition ranging from about 0.1% by weight to about 1% by weight of a mixture comprised of sintering agent composition and uranium dioxide, forming the resulting mixture into a compact, sintering said compact at a temperature at which said sintering agent is a liquid ranging from greater than about 1500° C. to a temperature at which there is no significant vaporization of $SiO_2$ to produce a sintered product having said average grain size and cooling said product producing said sintered body, said precursor thermally decomposing below said sintering temperature.

By "glassy" or "glassy magnesium silicate" it is meant herein an amorphous magnesium silicate.

In carrying out the present process, a sinterable uranium dioxide powder is provided containing a fissionable material or substance in an amount effective for making the resulting sintered body useful as nuclear fuel. Representative of such fissionable material is uranium such as U-235 and plutonium such as Pu-239. Normally, uranium dioxide powder contains fissionable isotope of uranium, and frequently it is enriched with such isotope. These powders are known in the art and generally contain fissionable isotope of uranium in an amount ranging from about 0.1% by weight to about 5% by weight of the total amount of uranium dioxide powder. The uranium dioxide powder has a total oxygen to a total uranium atomic ratio (O/U ratio) ranging from about 1.7 to about 2.25, frequently from greater than about 2.00 to about 2.15, depending largely on processing conditions.

Generally, the uranium dioxide powder used in the present process has a specific surface area ranging from about 2 to 12 square meters per gram, preferably from about 4 to 8 square meters per gram. Such powders allow sintering to be carried out within a reasonable length of time at the present sintering temperature. Uranium dioxide powder having a smaller surface area usually is not useful because it would require sintering temperatures too high to be practical and extraordinary measures to prevent evaporation of $SiO_2$. On the other hand, uranium dioxide powders having a larger surface area are difficult to handle because of their high chemical reactivity.

The sintering agent is comprised of from about 10 weight % to about 55 weight % MgO balance $SiO_2$. In one embodiment, the present sintering agent contains from about 10 weight % to about 40 weight % MgO, and in another embodiment, it contains from greater than about 40 weight % to about 55 weight % MgO.

The present sintering agent can be in a number of forms. For example, it can be a combination of MgO and $SiO_2$ powders and/or a magnesium silicate. The magnesium silicate can be a natural material, or it can be produced by a number of techniques such as by melting or solid state sintering of a blend of MgO and $SiO_2$ powders. The natural material can be a mineral preferably predominantly comprised of the present sintering agent. Representative of such natural materials is talc. Specifically, the natural material should be a material which, when fired, but before reaching sintering temperature, has a fired composition comprised of the present magnesium silicate and impurities in an amount of less than about 10% by weight of the fired composition. The impurities remaining in the fired composition should have no significant deleterious effect on the present nuclear fuel.

If desired, a particulate precursor for the sintering agent or part thereof can be used provided that it thermally decomposes completely at an elevated temperature below sintering temperature to form the sintering agent or part thereof and by product gas leaving no significant deleterious residue. Magnesium carbonate and magnesium nitrate are useful precursors for magnesium oxide.

The sintering agent is used in an amount ranging from about 0.1% by weight to about 1% by weight of the mixture comprised of uranium dioxide powder and sintering agent. The particular amount of sintering agent used is determinable empirically and depends largely on the particular sintered body desired. Frequently, the present sintering agent ranges from about 0.1% by weight to about 0.8% by weight, or from about 0.2% by weight to about 0.6% by weight, or from about 0.25% by weight to about 0.5% by weight, of the total weight of the mixture comprised of uranium dioxide and sintering agent. In one embodiment, the sintering agent ranges from about 0.1% by weight to less than about 0.5% by weight, or from about 0.1% by weight or 0.2% by weight to about 0.4% by weight, of the mixture comprised of uranium dioxide powder and sintering agent.

The sintering agent and/or source thereof can be admixed with the uranium dioxide powder by a number of conventional techniques, and preferably, they are admixed to form a mixture wherein the sintering agent is dispersed therein preferably at least significantly or substantially uniformly. The sintering agent and/or source thereof is particulate in form and the particles need only be of a size which will form the desired mixture, and generally, they are less than about 20 microns.

If desired, a pore-forming additive may also be admixed with the powder to aid in producing the desired porosity in the sintered body. Conventional pore-forming additives can be used such as, for example, ammonium oxalate, polymethyl methacrylate or other materials which volatilize away on heating below sintering temperature. The pore-forming additive can be used in a conventional manner in an effective amount. Generally, the amount of pore-forming additive ranges from about 0.1% by weight to about 2% by weight of the mixture comprised of uranium dioxide, sintering agent and pore-forming additive.

A number of conventional techniques can be used to shape or press the mixture into a compact. For example, it can be extruded, injection molded, die pressed or isostatically pressed to produce the compact of desired shape. Any lubricants, binders or similar materials used to aid shaping of the mixture should have no significant deleterious effect on the compact or the resulting sintered body. Such shaping-aid materials are preferably of the type which evaporate on heating at relatively low temperatures, preferably below 500° C., leaving no significant residue. Preferably, the compact has a porosity of less than about 60% and more preferably less than about 50% to promote densification during sintering.

The compact can have any desired configuration such as, for example, a pellet, cylinder, plate or square. Typically, the compact is in the form of a cylinder, usually a right cylinder.

The compact is sintered under conditions which will produce the present sintered body. The compact is sintered in an atmosphere which can vary depending largely on the particular manufacturing process. Preferably, the atmosphere is at or about ambient or at or about atmospheric pressure. The compact can be sintered in an atmosphere which is known to be useful for sintering uranium dioxide alone in the production of uranium dioxide nuclear fuel. However, sintering in a vacuum would not be useful since it would tend to vaporize the $SiO_2$. Generally, the compact is sintered in an atmosphere selected from the group consisting of hydrogen, wet hydrogen preferably having a dewpoint of about 20° C., a controlled atmosphere of a mixture of gases which in equilibrium produces a partial pressure of oxygen sufficient to maintain the uranium dioxide at a desired oxygen to uranium atomic ratio and a combination thereof. Representative of a suitable mixture of gases which in equilibrium produces a partial pressure of oxygen is carbon dioxide and carbon monoxide as disclosed in U.S. Pat. No. 3,927,154 to Carter assigned to the assignee hereof and incorporated herein by reference.

The compact is sintered at a temperature at which the sintering agent forms a liquid phase with the uranium dioxide which enables production of the present liquid phase-sintered body. Generally, the higher the $SiO_2$ content of the sintering agent the lower is the temperature at which the liquid phase forms. The present sintering temperature ranges from above about 1500° C. to a temperature at which there is no significant vaporization of $SiO_2$. Generally, it ranges from above about 1500° C. to about 2000° C., preferably from about 1540° C. to about 1750° C., and more preferably from about 1600° C. to about 1700° C.

When the sintering agent contains from about 10 weight % to about 40 weight % MgO, generally at sintering temperature only solid uranium dioxide and a liquid phase are present. On cooling, generally such liquid phase produces only a glassy magnesium silicate phase. Generally, this glassy phase has a composition which is the same as, or which does not differ significantly from, that of the sintering agent, and it is present in an amount which is the same as, or which does not differ significantly from, the amount of sintering agent used.

However, when the sintering agent contains more than about 40 weight % MgO, generally it produces in the sintered body a glassy phase comprised of from about 35 weight % to about 45 weight % MgO, frequently about 4 weight % MgO, balance SiO$_2$ and some crystalline magnesium silicate phase. Generally, in this embodiment of the invention, the total amount of glassy and crystalline magnesium silicate phases produced is the same as, or does not differ significantly from, the amount of sintering agent used. Specifically, the total amount of glassy and crystalline magnesium silicate phases generally rages from about 0.1% by weight to about 1% by weight of the sintered body with the glassy phase component being present in an amount of at least about 0.05% by weight of the sintered body, and the crystalline magnesium silicate phase component being present in at least a detectable amount, i.e. an amount detectable by transmission electron microscropy and selected area electron diffraction. Ordinarily, as the MgO content of the sintering agent is increased, the amount of crystalline magnesium silicate present in the sintered body increases.

When the sintering agent contains more than about 40 weight % MgO, it may or may not be totally liquid at sintering temperature. When it is totally liquid, cooling of the liquid phase generally precipitates out some crystalline magnesium silicate and produces a sintered body wherein crystalline magnesium silicate grains are present in the glassy phase in pockets between the coated uranium dioxide grains. However, at lower sintering temperatures and/or higher MgO contents, the sintering agent may produce a liquid phase and also some crystalline magnesium silicate at sintering temperature which results in a sintered body wherein small grains of crystalline magnesium silicate are present in the glassy phase in pockets between the coated uranium dioxide grains and wherein large grains of crystalline magnesium silicate protrude into the coated uranium dioxide grains. The crystalline magnesium silicate grains which protrude into the uranium dioxide grains are significantly larger, usually at least about 20% larger, than crystalline magnesium silicate grains located in the glassy phase. Also, the crystalline magnesium silicate grains which protrude into the uranium dioxide grains generally are present in an amount of less than about 50% by volume of the total amount of crystalline magnesium silicate phase present in the sintered body. The crystalline magnesium silicate phase is selected from the group consisting of MgSiO$_3$, Mg$_2$SiO$_4$ and a mixture thereof.

The compact is maintained at sintering temperature for a time required to produce the present sintered body. Time at sintering temperature is determinable empirically depending largely on the particular sintered body desired. Generally, the grain size of uranium dioxide in the sintered body is determined by sintering temperature, time at sintering temperature and by the sintering agent. Ordinarily, the higher the sintering temperature and/or the longer the time at sintering temperature, the larger are the uranium dioxide grains. Higher magnesium oxide contents in the sintering agent also result in larger uranium dioxide grains.

The rate of heating to sintering temperature is limited largely by how fast any by-product gases are removed prior to sintering and generally this depends on the gas flow rate through the furnace and its uniformity therein as well as the amount of material in the furnace. Generally, a rate of heating of from about 50° C. per hour to about 300° C. per hour is used until by-product gases have been removed from the furnace, and this may be determined empirically by standard techniques. The rate of heating can then be increased, if desired, to a range of about 300° C. to 500° C. per hour and as high as 800° C. per hour but should not be so rapid as to crack the bodies.

Upon completion of sintering, the sintered product is cooled to produce the present sintered body, and usually it is cooled to ambient or to about room temperature, generally about 20° C. to 30° C. The rate of cooling of the sintered product or body is not critical, but it should not be so rapid as to crack the body. Specifically, the rate of cooling can be the same as the cooling rates normally or usually used in commercial sintering furnaces. These cooling rates may range from about 100° C. to about 800° C. per hour. The sintered product or body can be cooled in the same atmosphere in which it was sintered or a different atmosphere which has no significant deleterious effect thereon.

In one embodiment, the present sintered body is comprised of crystalline uranium dioxide grains and an amorphous glassy magnesium silicate phase comprised of from about 10 weight % to about 40 weight % MgO balance SiO$_2$. In this embodiment, the glassy phase ranges from about 0.1% by weight to about 1% by weight of the sintered body. Frequently, it ranges from about 0.1% by weight to about 0.8% by weight, or from about 0.2% by weight to about 0.6% by weight, or from about 0.25% by weight to about 0.5% by weight, or from about 0.1% by weight to less than about 0.5% by weight, or from about 0.1% by weight or 0.2% by weight to about 0.4% by weight, of the sintered body.

In another embodiment, the present sintered body is comprised of crystalline uranium dioxide, glassy magnesium silicate phase comprised of from about 35 weight % to about 45 weight % MgO, frequently about 40 weight % MgO, balance SiO$_2$ and crystalline magnesium silicate phase, with the crystalline magnesium silicate phase being present in at least a detectable amount and the glassy phase being present in an amount of at least about 0.05% by weight of the body. Generally, in this embodiment, the total amount of glassy and crystalline magnesium silicate phases is the same as, or does not differ significantly from, the amount of sintering agent used. Specifically, the total amount of glassy and crystalline magnesium silicate phases ranges from about 0.1% by weight to about 1% by weight, or from about 0.1% by weight to about 0.8% by weight, or from about 0.2% by weight to about 0.6% by weight, or from about 0.25% by weight to about 0.5% by weight, or from about 0.1% by weight to less than about 0.5% by weight, or from about 0.1% by weight or 0.2% by weight to about 0.4% by weight, of the sintered body. Frequently, the glassy phase component is present in an amount greater than about 0.05% by weight, or greater than about 0.1% by weight, or greater than about 0.2% by weight of the sintered body. Also, frequently, the crystalline magnesium silicate phase component is present in an amount of at least about 0.01% by weight, or at least about 0.1% by weight, or at least about 0.2% by weight, of the sintered body.

The present sintering agent in an amount of less than about 0.1% by weight may not produce the present sintered body. On the other hand, the sintering agent in an amount greater than about 1% by weight produces an excessive amount of glassy and/or crystalline magnesium silicate phases which provide no significant advantage, and which would occupy space that could usefully be occupied by uranium dioxide.

Generally, the glassy phase in the sintered body is free of uranium dioxide. However, it is possible that in some instances some uranium dioxide might be present in the glassy phase in a minor amount detectable by exotic analysis not believed to be presently available, and in such instances, the uranium dioxide ordinarily would range up to about 0.5% by weight of the glassy phase.

The glassy magnesium silicate phase in the sintered body is a continuous interconnecting phase. The glassy phase coats each uranium dioxide grain leaving no significant portion thereof exposed of at least about 99% by volume, preferably more than 99.5% by volume, of the total volume of uranium dioxide grains in the sintered body. Most preferably, it coats every uranium dioxide grain leaving no significant portion thereof exposed. By a glassy phase which coats a uranium dioxide grain leaving no significant portion thereof exposed it is meant a coating which covers at least substantially all of the grain. Specifically, the glassy phase forms a thin continuous adherent coating on each uranium dioxide grain it coats which generally ranges from about 5 to about 20 Angstroms in thickness. In a preferred embodiment, the glassy phase coats each uranium dioxide grain totally, i.e. it totally envelops, each uranium dioxide grain of at least about 99% by volume, preferably more than 99.5% by volume, of the total volume of uranium dioxide grains in the sintered body. More preferably, the glassy phase coats every uranium dioxide grain totally. The glassy magnesium silicate phase also extends to some degree into the interstices, i.e. 3-grain and 4-grain interstices, between the coated uranium dioxide grains. The extent to which the glassy phase fills the interstices depends largely on the amount of sintering agent in the sintered body. The morphology of the microstructure of the sintered body indicates that the glassy magnesium silicate phase was a liquid at sintering temperature.

The uranium dioxide grains in the sintered body have an average grain size, i.e. average diameter, ranging from about 20 microns to about 100 microns, preferably from about 30 microns to about 80 microns, frequently from about 40 microns to about 70 microns, and more frequently from about 45 microns to about 60 microns. In one embodiment of the present invention, the uranium dioxide grains do not differ significantly in size.

BRIEF DESCRIPTION OF DRAWINGS

The average grain size can be determined in a standard manner. In the present invention a standard line intercept technique was used. Specifically, a line was drawn on a photomicrograph of a polished and etched cross-section of the sintered body, and the grain boundaries intercepting along a specific length of line were counted and divided into that specific length of line to give an average grain intercept length in terms of microns. That value was then multiplied by 1.5 to determine the average grain size.

The present sintered body has the appearance of having been liquid phase sintered. The uranium dioxide grain corners as viewed in a polished section often appear rounded with glassy phase pockets located at the grain corner, i.e. they have the appearance of a liquid phase sintered ceramic. Generally, the uranium dioxide grains are equiaxed or substantially equiaxed.

The present sintered body generally is free of crystalline phases of MgO and $SiO_2$.

The present sintered body always contains some porosity which generally is a closed porosity, i.e. non-interconnecting pores. The porosity is distributed through the sintered body, and preferably, it is distributed at least significantly or substantially uniformly. Generally, the porosity of the sintered body ranges from about 2% by volume to less than about 10% by volume of the sintered body depending largely on reactor design. Frequently, the porosity ranges from about 4% by volume to about 8% by volume, more frequently from about 4% by volume to about 6% by volume, and most frequently about 5% by volume, of the total volume of the sintered body. Preferably, the pores range in size from greater than about 1 micron to about 20 microns, and more preferably from about 5 microns to about 20 microns.

Ordinarily, the dimensions of the present sintered body differ from those of the unsintered body by the extent of shrinkage, i.e. densification, which occurs during sintering.

A magnesium silicate outside the present range is not operable as a sintering agent to produce the present sintered body. Generally, a magnesium silicate containing more than about 90 weight % $SiO_2$ will produce a sintered body with too small a grain size. On the other hand, a magnesium silicate containing MgO in an amount of more than about 55 weight % generally is not useful because the amount of the glassy phase usually is too small with most of the sintering agent present as crystalline magnesium silicate.

$SiO_2$ alone is not useful as a sintering agent because it produces a sintered body with too small a grain size, and the glassy phase formed does not distribute itself uniformly throughout the sintered body. Likewise, MgO alone would leave crystalline MgO in the sintered body. Crystalline phases do not impart plasticity at elevated temperature to a sintered uranium dioxide body which is significantly higher than that of uranium dioxide alone.

The present sintered body is useful as a nuclear fuel. It contains fissionable material generally in the same amount present in the uranium dioxide powder. The large grain size of the present sintered body should significantly lower fission gas release rates. Also, the glassy phase coating the uranium dioxide grains imparts to the sintered body a plasticity or creep rate which allows the fuel to perform without putting significant stress on the cladding.

The invention is further illustrated by the following example wherein the procedure was as follows, unless otherwise stated:

Submicron sinterable uranium dioxide powder containing a fissionable isotope of uranium and having an oxygen to uranium atomic ratio of about 2.16 was used.

The sintering agent was particulate in form.

The sintering agent was admixed with the uranium dioxide powder in a standard manner by stirring to produce a substantially uniform mixture.

The mixture of uranium dioxide powder and sintering agent was die pressed in a steel die to give a green body in pellet form, i.e. a compact in the form of a roughly equiaxed cylinder with a porosity of about 50%.

The sintering atmosphere was hydrogen at or about atmospheric pressure.

Density was determined in a standard manner by weighing the sintered body and measuring its dimensions.

Porosity of the sintered body was determined by knowing or estimating the theoretical density of the sintered body on the basis of its composition and comparing that to the density measured using the following equation:

$$posority = \left(1 - \frac{\text{measured density}}{\text{theoretical density}}\right)100\%$$

Average uranium dioxide grain size of the sintered body was determined by the line intercept method disclosed The sintered body was characterized by a number of standard techniques.

Based on other work, it was known that the sintered body had an oxygen to uranium atomic ratio of about 2.00.

EXAMPLE 1

The sintering agent was comprised of 35 weight % MgO powder and 65 weight % $SiO_2$ powder.

The sintering agent was admixed with the uranium dioxide powder to produce a substantially uniform mixture containing the sintering agent in an amount of 0.1% by weight of the total mixture.

The mixture was pressed into a compact. The compact was sintered at about 1640° C. for 7 hours and then furnace-cooled to about room temperature. A cross-section of the sintered body was mechanically thinned, ion-milled, and examined by transmission electron microscopy. It was comprised of uranium dioxide grains and a thin intergranular glassy phase. A transmission electron micrograph showing the thin intergranular glass phase is shown in the figure. Based on other work, it was known that the glassy phase was a magnesium silicate comprised of about 35 weight % MgO and about 65 weight % $SiO_2$ and that the total amount of glassy phase in the sintered body did not differ significantly from the amount of sintering agent used. Also, based on other work, it was known that the glassy phase was continuous, interconnecting and coated each uranium dioxide grain of more than 99% by volume of the uranium dioxide grains leaving no significant portion thereof exposed.

The sintered body had a porosity of about 2.6% by volume which was comprised of closed pores distributed in the body.

The uranium dioxide grains did not differ significantly in size and had an average size of about 22 microns.

The sintered body is useful as nuclear fuel. Based on other work, it is known that the creep rate of this sintered body should increase rapidly with stress and should be substantially higher than that reported in the literature for similar sintered bodies of uranium dioxide alone of smaller average grain size. The high deformation rate of the present nuclear fuel will allow the fuel to perform without putting significant sustained stress on the cladding.

Also, the larger grain size of the present fuel should result in significantly lower fission gas release rates.

What is claimed is:

1. A process for producing a sintered uranium dioxide body useful as nuclear fuel wherein the uranium dioxide grains have an average grain size ranging from about 30 microns to about 80 microns and wherein at least about 99% by volume of the uranium dioxide grains are each coated with glassy magnesium silicate phase leaving no significant portion thereof exposed, said body having a porosity ranging from about 2% by volume to less than about 10% by volume, which consists essentially of providing uranium dioxide powder containing a fissionable substance, providing a sintering agent consisting essentially of from about 10 weight % to about 55 weight % MgO balance $SiO_2$ or precursor therefor, admixing said sintering agent or precursor therefor with said uranium dioxide to give said sintering agent composition ranging from about 0.1% by weight to about 0.8% by weight of a sinterable mixture consisting essentially of said sintering agent composition and uranium dioxide, forming the resulting mixture into a compact, sintering said compact at a temperature at which said sintering agent forms a liquid phase ranging from greater than about 1500° C. to a temperature at which there is no significant vaporization of said $SiO_2$ under conditions wherein the oxygen to uranium atomic ratio ranges from about 1.7 to about 2.25 to produce a sintered product having said average grain size and cooling said product to produce said sintered body, said precursor thermally decomposing below said sintering temperature.

2. The process according to claim 1 wherein said oxygen to uranium atomic ratio ranges from about 2.00 to about 2.15.

3. The process according to claim 1 wherein said porosity of said sintered body ranges from about 4% by volume to about 8% by volume of said sintered body.

4. The process according to claim 1 wherein said sintering agent composition ranges from about 0.2% by weight to about 0.4% by weight of said sinterable mixture.

5. The process according to claim 1 wherein said sintering agent composition ranges from about 0.1% by weight to about 0.2% by weight of said sinterable mixture.

6. The process according to claim 1 wherein said sintering agent composition ranges from about 0.2% by weight to about 0.6% by weight of said sinterable mixture.

7. The process according to claim 1 wherein said sintering agent composition ranged from about 0.1% by weight to less than about 0.5% by weight of said sinterable mixture.

8. The process according to claim 1 wherein said sintering agent consists essentially of from about 10 weight % to about 40 weight % MgO balance $SiO_2$.

9. The process according to claim 1 wherein said sintering agent consists essentially of from greater than about 40 weight % to about 55 weight % MgO balance $SiO_2$.

10. The process according to claim 1 wherein said sintering temperature ranges from about 1540° C. to 1800° C.

11. The process according to claim 1 wherein said precursor is magnesium carbonate.

12. The process according to claim 1 wherein said sintering is carried out in a gaseous atmosphere of wet hydrogen.

13. The process according to claim 1 wherein said sintering is carried out in a gaseous atmosphere comprised of a mixture of carbon dioxide and carbon monoxide.

14. The process according to claim 1 wherein said average grain size of uranium dioxide ranges from about 30 microns to about 70 microns.

15. A nuclear fuel body consisting essentially of crystalline uranium dioxide grains and an amorphous glassy phase of magnesium silicate, said uranium dioxide grains having an average size ranging from about 30 microns to about 80 microns, said glassy phase being continuous and interconnecting, each grain of at least about 99% by volume of said uranium dioxide grains being coated with said glassy phase leaving no significant portion thereof exposed, said glassy phase ranging from about 0.1% by weight to about 0.8% by weight of said body, said body having a porosity ranging from abut 2% by volume to less than about 10% by volume of said body.

16. The body according to claim 15 wherein said glassy phase consists essentially of from about 10 weight % to about 40 weight % MgO balance $SiO_2$.

17. The body according to claim 15 wherein said porosity ranges from about 4% by volume to about 8% by volume of said body.

18. The body according to claim 15 wherein said average size of said uranium dioxide grains ranges from about 40 microns to about 70 microns.

19. The body according to claim 15 wherein said glassy magnesium silicate phase ranges from about 0.1% by weight to less than about 0.5% by weight of said body.

20. A nuclear fuel body consisting essentially of crystalline uranium dioxide grains, an amorphous glassy magnesium silicate phase and crystalline magnesium silicate phase, said uranium dioxide grains having an average size ranging from about 30 microns to about 80 microns, said glassy phase being continuous and interconnecting, each grain of at least about 99% by volume of said uranium dioxide grains being coated by said glassy phase leaving no significant portion thereof exposed, the total amount of said glassy and crystalline magnesium silicate phases ranging from about 0.1% by weight to about 0.8% by weight of said body, said glassy phase being present in an amount of at least about 0.05% by weight of said body, said crystalline magnesium silicate phase being present in at least a detectable amount, said body having a porosity ranging from about 2% by volume to less than about 10% by volume of said body.

21. The nuclear fuel body according to claim 20 wherein said crystalline magnesium silicate phase is present in said glassy phase in pockets between said coated uranium dioxide grains.

22. The nuclear fuel body according to claim 20 wherein said crystalline magnesium silicate phase is present in said glassy phase in pockets between said coated uranium dioxide grains and also protrudes into said coated uranium dioxide grains.

23. The nuclear fuel body according to claim 20 wherein said glassy phase consists essentially of from about 35 weight % by about 45 weight % MgO balance $SiO_2$.

24. The nuclear fuel body according to claim 20 wherein said crystalline magnesium silicate is selected from the group consisting of $MgSiO_3$, $Mg_2SiO_4$ and a mixture thereof.

25. The nuclear fuel body according to claim 20 wherein said porosity ranges from about 4% by volume to about 8% by volume of said body.

26. The nuclear fuel body according to claim 20 wherein said average size of said uranium dioxide grains ranges from about 40 microns to about 70 microns.

27. The nuclear fuel body according to claim 20 wherein said glassy magnesium silicate phase is present in an amount greater than about 0.05% by weight of said body, and said crystalline magnesium silicate phase is present in an amount of at least about 0.01% by weight of said body.

28. The process according to claim 1 wherein said uranium dioxide grains have an average size ranging from about 40 microns to about 70 microns.

29. The process according to claim 1 wherein said uranium dioxide grains have an average size ranging from about 45 microns to about 60 microns.

30. The process according to claim 1 wherein a natural material is used to provide said sintering agent said material when fired but below said sintering temperature having a fired composition consisting essentially of said sintering agent and impurities in an amount of less than about 10% by weight of the fired composition.

31. The nuclear fuel body according to claim 15 wherein said uranium dioxide grains have an average size ranging from about 45 microns to about 60 microns.

32. The nuclear fuel body according to claim 20 wherein said uranium dioxide grains have an average size ranging from about 45 microns to about 60 microns.

* * * * *